Feb. 13, 1951          H. SCHMOLL              2,541,891
                    MEASURING INSTRUMENT
                    Filed Feb. 19, 1946

INVENTOR.
HENRY SCHMOLL
BY
George M. Soule
ATTORNEY

Patented Feb. 13, 1951

2,541,891

UNITED STATES PATENT OFFICE 2,541,891

MEASURING INSTRUMENT

Henry Schmoll, Parma, Ohio

Application February 19, 1946, Serial No. 648,653

6 Claims. (Cl. 33—169)

This invention relates to precision measuring instruments of the class technically known as precision gage blocks. The blocks are usually identified in machine shops as Johansson or "Jo" blocks and for purposes of discussion herein they will be identified simply as gage blocks. Gage blocks are sold in sets and are very expensive. Their use to obtain measurements in the most frequently used fractional dimensions of an inch (i. e. down to $\frac{1}{32}$" divisions) often requires timestaking computation. Moreover, in order to obtain a full range of fractional dimensions such as mentioned several blocks must, in most cases, be carefully selected and wrung together, thus introducing chances of error in their manipulation due, for example, to accumulations of foreign matter on the individual blocks, though sometimes because of lack of skill on part of the user. The individual surfaces of all the blocks used must afterward be carefully wiped off and the blocks must be returned to the proper places in the set. The above discussion indicates the need for a simpler system of preicsion distance measurement in commonly used fractional dimensions; and an object of the present invention is to provide one such simpler system.

Line scribing of work to be machined is generally done either by an adjustable height gage equipped with a scriber or by holding a scriber bar on top of a stack of gage blocks built up to the required height and then moving the assembly to scribing position on a surface plate. Use of the adjustable height gage usually requires the timestaking prelminary operation of assembling the proper number of gage blocks in order to set the scriber point, and when the scribing is done directly from a built up set of gage blocks it is difficult to hold the scriber in position on the top block. If several gage blocks are required then it is difficult to keep the latter from sliding out of place while scribing. One problem solved by the instrument hereof is to reduce the time required in accurate scribing of lines, thus indicating a further object hereof.

Another object is to provide in connection with a stepped base block an auxiliary block for obtaining all the necessary divisions of a desired unit of length smaller than the divisions afforded by the scriber bars and base but furnishing stable supports for such scriber bars.

A further object is to provide a stepped precision gage block made as one piece of metal.

Another object is to provide a precision gage block set requiring only a very few individual pieces to obtain measurements and scribe marks in a large number of divisions of an inch or other unit.

A still further object is to provide a gage block set including two or more (e. g.) scriber tools and a multiple surface base block, which tools can be used with the base block to multiply the distance values affordable by the base block alone and enable the circle center and several tangent lines for the circle to be formed quickly and with extreme accuracy.

Other objects and the special advantages of the present invention will become apparent from the following description of the illustrative form or forms. The specific dimensions given in connection with said forms are for example only.

The main or base block 1 is of generally triangular shape, having two main base, reference or fiducial surfaces 2 and 3 at right angles to each other and a series of steps collectively indicated at 4 forming the third side or hypotenuse of the triangle. Parallel end surfaces 5 and 6 (Fig. 3) are also preferably formed as fiducial reference surfaces, in which case their spacing is somewhat different from any other dimension that can be measured by the block with or without use of the auxiliary blocks or scriber tools 10 and 30 of Figs. 1 and 2 respectively.

The block 1 is of high grade steel or other hard wear resisting metal which will not become permanently changed in shape or size by temperature variations. It is preferably made and finished the same way as are precision gage blocks, the making whereof is known to the public at the present time. The fiducial surfaces 2, 3, 5 and 6 are preferably planar but, being farly large, may be relieved inwardly from their boundaries to reduce the area of surface contact or for other purposes.

All the measuring surfaces and reference surfaces are carefully lapped to obtain as nearly as possible correct size within a few millionths of an inch. The pieces, before final finish is effected, are seasoned for a time at appropriate subzero temperatures to make certain that the molecular structure of the metal will remain stable.

Figure 1:
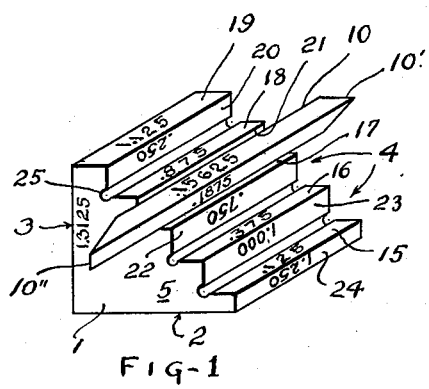
Fig. 1 is a perspective view showing the main or base block and one form of auxiliary block or bar in the form of a scriber.

Referring to the steps 4, those in the position of the block 1 shown in Fig. 1 start with a height as measured by the distance between the surface 15 and the base surface 2 of 1/8" as indicated on the drawing. The remaining steps are each exactly 1/4" higher than the next preceding one, which is to say the step surface 16 is 3/8" above the reference surface 2, the surface 17 is 5/8", the surface 18 is 7/8" and the top surface 19 is 1 1/8". All the surfaces 15 to 19 inclusive are strictly parallel to the base or reference surface 2 of the block. It will be apparent that the block alone in the position shown by Fig. 1 is capable of affording five different measurements, and that each surface 15 to 19 inclusive is of adequate size to receive contact with a dial indicator feeler as of a comparator and that, assuming appropriate clearance on pieces to be measured, the block may be used as a slip gage.

Figure 2:
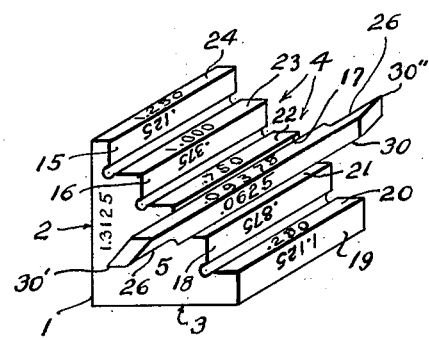
Fig. 2 is a similar view showing a different auxiliary block or bar in the form of a stepped scriber.

When the block is placed with its reference surface 3 in contact with (e. g.) a surface plate, the portions of the steps which form the risers in the position of the block shown by Fig. 2 become the height measuring surfaces. An appropriate arrangement of distances is to have the first step 20 measure 1/4" from the reference surface and the other steps 21, 22, 23 and 24 each successively 1/4" higher than the next adjacent step. Thus the single block, without any assistance, by selective reversal of base surfaces, affords ten different commonly used fractional measurements at 1/8" increments. The two sets of surfaces 15—19 and 20—24 are preferably separated from each other by relief grooves such as shown at 25 to facilitate grinding and lapping.

The bars 10 and 30 are both made and finished as precision instruments, for example the same as gage blocks are made and finished.

The bar 10 in the particular measurement system provided by the set has 5/32" as one transverse dimension and 3/16" as the other. Those dimensions may be considered the two heights of the bar when used either for scribing or as a gage block. The bar 10 is in the form of a straight scriber, being beveled at its ends to provide scriber edges 10' and 10" in intersecting planes, thus affording two sharp points at each corner which can be resharpened precisionally simply by regrinding the bevels.

When the bar 10 is placed on one of the steps of the block 1 in the manner indicated in Fig. 1, the edge 10' scribes a line exactly 3/16" above the height of the selected step or, as shown, 13/16" above the base surface 2. If the bar 10 is inverted then the scribed line is at the height (above surface 2) of the step on which the bar is held. Similarly the edge 10" can be used to scribe at two different elevations.

Figure 4:
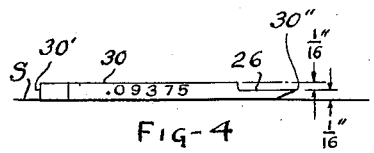
Fig. 4 is a top view of the scriber shown in Fig. 3.
Figure 3:
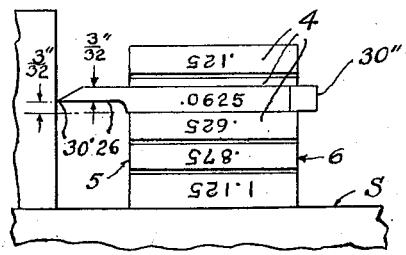
Fig. 3 is a side elevation showing use of the set for scribing, using thhe scriber according to Fig. 2.

The stepped scriber bar 30 preferably has its beveled points lying half way between the associated wide and narrow sides of the bar, as shown by Figs. 3 and 4, so that a scribed line made by the point 30' (see Fig. 3) is always at the same height in either of two relatively inverted positions of the bar and so that the point 30' always scribes at the same height (see Fig. 4) regardless of inversion of the bar. When using the bar 30 as a gage block for height measurement, as in setting a comparator, the bar in order to give the proper height reading in accordance with the marking on the bar (see .0625" or .09375") is placed for example as in Fig. 4 and the feeler of the comparator making contact with the appropriate one of the step surfaces 26 adjacent the scriber edge. Those step faces are therefore formed as precision surfaces strictly parallel to the opposite faces of the bar.

It will be evident that to measure 1/16" height above any given surface one lays the stepped scriber bar 30 on the surface in the position shown by Fig. 4, wherein the surface is indicated at S. To measure 3/32" one uses only the stepped scriber bar 30 turned the proper side up, that is inverted from the positions shown by Figs. 2 and 3, and makes measuring contact with the then upwardly facing step 26. To measure 1/8" the step 15 of the block 1 is used and to scribe to that height one uses either end of the straight scriber bar 10, point down. To measure or scribe 5/32" one uses the straight scriber bar in the position shown by Fig. 1, reversed 90°, but on a surface plate or its equivalent. To measure 3/16" the scriber bar 10 is used in the position shown by Fig. 1, and for scribing to that height the edge 10" is upwardly of the bar. To measure or scribe to a height of 7/32" one places the stepped scriber bar on the first step 15 of the block 1 in the position of the latter according to Fig. 1 and with the measuring face 26 of point 30' upwardly. For 1/4" the step 20 and straight scriber is used; and from that height up to the highest step 24 of the block 1 in the position of the latter shown by Fig. 2 all divisions are available in 1/32" steps. The highest that may be reached with the aid of one scriber bar is 1 7/16", that being with the straight scriber placed with its 3/16" dimension vertically on the step 24 of the block 1. The two scriber bars may of course be stacked for some additional height.

Other height measurements can be had with the block 1 stood on end, the block shown being 1 5/16" long as indicated decimally in Figs. 1 and 2.

In each of the most commonly used scribing positions of the scriber bars the latter are held against respective vertical and horizontal faces of the block 1 as by the thumb and fingers of the hand, making the set very stable and easily manipulated.

Figures 6, 7:
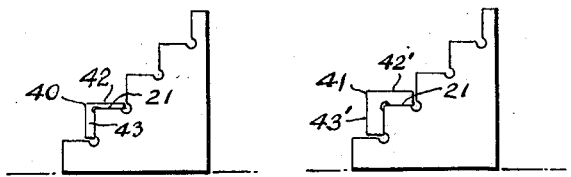
Fig. 6 and 7 are end views showing modified auxiliary blocks in typical positions on the base block.

If it is desired to provide for dividing the measurement increments into 64ths of an inch the auxiliary angle blocks 40 and 41 of Figs. 6 and 7 respectively may be used individually or complementing each other and in combination with the block 1 and/or the scriber bars 10 and 30. The flanges 42 and 43 or 42' and 43' of the angle blocks are preferably slightly less than 1/4" wide measured from the intersection points of the inside faces.

Each of the angle blocks 40 and 41 can be used to obtain respective height measurements in four different positions, one only of each being illustrated. Assuming the flange 42 of block 40 measures 3/64" and the flange 43 5/64". Assuming further that the flanges 42' and 43' of the angle block 41 measure respectively 7/64" and 9/64", one can apply the blocks 40 and 41 individually to the various stair steps of the main block 1 either in such manner that the stair steps fit against the inside surfaces of the angle blocks as illustrated or so that the step and riser surfaces of the block 1 engage respectively the outside flange faces of the angle blocks. Thus, when using the stepped block 1 as a base, one is enabled to start with a minimum height measurement of 11/64" when the flange 42 of the angle block 40 is resting upon the step 15 of the base block 1 and with the latter positioned as shown in Fig. 1. The angle blocks 40 and 41 can, of course, be used directly on a surface plate individually or in nested or stacked arrangement with each other (not necessary) and in stacked relation to either scriber bar 10 or 30 in selected rotated positions of the scriber bars described.

Starting with a minimum measurement of 3/64" when the thinest angle block flange (42) is resting on a surface plate, the 1/64" increments up to 5/16" (repeating for greater heights) are obtained as follows:

1/16": scriber bar 30; 5/64": flange 43 of angle block 40; 3/32": scriber bar 30; 7/64": flange 42" of angle block 41; 1/8": step 15 of main block 1; 9/64": step 43' of angle block 41; 5/32": scriber bar 10; 11/64": main block step 15 with flange 42 of angle block 40; 3/16": scriber bar 10; 13/64": scriber bar 10 (5/32") with flange 42 of angle block 40; 7/32": step 15 of main block with scriber bar 30 (3/32"); 15/64": step 15 of main block 1 with flange 42' of angle block 41; 1/4": step 20 of block 1; 17/64": step 15 of block 1 with flange 43' of angle block 41; 9/32": step 15 of block 1 with scriber bar 10 (5/32"); 19/64": step 20 of block 1 with flange 42 of angle block 40; 5/16": step 20 of block 1 with scriber bar 30 (1/16").

In all the different combinations necessary to obtain 1/64" increments, it is never necessary to use more than three blocks or pieces at a time and, when using the angle blocks on the base block 1 for scribing, the selected scriber bar can be used to hold the angle block on the base block against displacement perpendicular to the riser faces of the steps. With a scriber bar placed on any selected face of the angle blocks, the scriber may be held against an aligning vertical or riser face of the base block to steady the scribing operation, except of course when the angle blocks are in their topmost positions (resting on the faces 19 or 24 of the base block). The angle blocks 40 and 41 are preferably the same length as the base block 1 and made without scribers.

Figure 5:
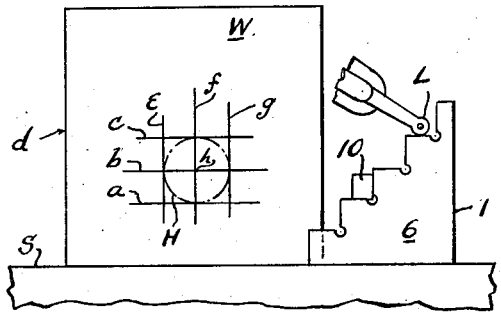
Fig. 5 is an end view of the base block and one scriber in one of several relative positions, enabling "boxing in" of a circle on a work piece.

The representation of a "boxed" 1/2" circle on a work piece W in Fig. 5 is illustrative of one use of the set. The parallel lines a, b and c were scribed by placing the straight scriber 10 successively on the faces 21, 22 and 23 edge down and sliding the work on the surface plate S past the scriber edges or by sliding the assembled base block and scriber past the work. Then with the work piece rotated 90° so that, for example, reference surface d of the work piece is in contact with the surface plate, the other lines e, f and g are similarly scribed the proper distance from the reference surface d by means of the base block 1 and appropriate scriber bar. Thus, the intersection h of lines b and f determines the center of a hole, for example, to be bored in the piece W. Any initial runout of the drill or boring tool can be detected by failure of the circle H defining the hole to be tangent to the "boxing" lines a, c, etc.

A typical feeler L of a dial indicator is shown in Fig. 5 resting on one of the steps of the base block. Such measuring or instrument checking contact would be made similarly with the uppermost faces or step faces of the scriber bars or with the angle blocks 40 and 41.

I claim:

1. A precision measuring instrument of the gage block class, comprising an integral metal block having two relatively fixed fiducial surfaces at right angles to each other and a plurality of steps forming a hypotenuse portion of the block and presenting a set of measuring surfaces parallel to one of the fiducial surfaces and disposed equal distances apart and another set of measuring surfaces parallel to the other fiducial surface and disposed equal distances apart, the measuring surfaces of one set which are disposed nearest the associated fiducial surface being closer to the latter than are the corresponding measuring surfaces of the other set with reference to their associated fiducial surface, whereby each set of step surfaces affords a series of regularly increasing height measurements above a reference surface on which the fiducial surfaces may be placed selectively, which height measurements are all different from those afforded by the other set.

2. A precision measuring set comprising an integral right triangular metal block with a hypotenuse portion of stair step form and a scriber bar adapted to be supported in two different rotated positions of the bar about its axis selectively on either set of step faces and in face to face contact therewith, said scriber bar being useable as a gage block to obtain different height measurements on each step when rotated as mentioned and being beveled in directions at right angles to each other at opposite ends to provide a scriber edge and associated paired points, which edges are in intersecting relationship appropriate to the desired rotated positions of the bar.

3. A precision measuring set comprising an integral right triangular metal block with a hypotenuse portion comprising faces in the form of stair steps, and a scriber bar of rectangular cross section, said bar being supportable selectively in face to face contact with the step faces for use as a gage block and having its scriber edge located equidistantly from opposite parallel faces of the bar so that the bar may be reversibly positioned to scribe a line at a single required height.

4. The set according to claim 3, wherein the bar has stepped bevel formed scriber points in intersecting planes parallel to respectively different measuring faces of the bar.

5. A precision measuring instrument of the gage block class, comprising a generally triangular integral metal block having two fiducially surfaced sides at right angles to each other and usable selectively as bases capable of stably supporting the block in position and a connecting or hypotenuse side comprising two series of steps providing two sets of precisionally formed surfaces all parallel to respective base sides, all the step surfaces of each individual set being of equal increments but the increments of the two sets being different from each other and all the step surfaces of one set being spaced differently from the associated base side than are all the step surfaces of the other set from their associated base side.

6. A precision measuring set comprising an integral right triangular metal block of ample dimensions for stable self support on four sides, two of said sides comprising fiducial base faces at right angles to each other and the block having a hypotenuse portion of stair step form and with fiducial steps in relation to respective relatively opposite fiducial base faces and of the same length as said faces measured normal to the other two faces, and an elongated bar with at least two sets of opposite parallel main faces differently spaced apart and complementing the measurements affordable by the stair steps as described, said bar being thereby selectively usable as a gage block on the step faces to provide different thickness measurements in respectively different rotated positions of the bar about its longitudinal axis.

HENRY SCHMOLL.

REFERENCES CITED

The following references are of record in the file of this patent:

UNITED STATES PATENTS

| Number | Name | Date |
|---|---|---|
| 697,701 | Ayer | Apr. 15, 1902 |
| 1,433,559 | Lowenstein | Oct. 31, 1922 |
| 1,491,099 | Hoke | Apr. 22, 1924 |
| 2,345,424 | Pfeifer | Mar. 28, 1944 |
| 2,372,368 | Dierking | Mar. 27, 1945 |
| 2,400,441 | Scone | May 14, 1946 |

OTHER REFERENCES

Publication: Johansson Catalog No. 17, June 1945.